(12) United States Patent
Lichter et al.

(10) Patent No.: US 7,703,837 B2
(45) Date of Patent: Apr. 27, 2010

(54) SEALING SYSTEM OF B-PILLARLESS REAR SLIDING DOOR

(75) Inventors: Martin Lichter, Nordrhein-Westfalen (DE); Thomas Benderoth, Gummersbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 11/944,664

(22) Filed: Nov. 26, 2007

(65) Prior Publication Data

US 2008/0122250 A1     May 29, 2008

(30) Foreign Application Priority Data

Nov. 27, 2006   (DE) .................. 10 2006 055 817

(51) Int. Cl.
    *B60J 5/06*   (2006.01)
(52) U.S. Cl. .................................. 296/155; 296/146.1
(58) Field of Classification Search .............. 296/146.1, 296/147, 148, 155, 146.9
    See application file for complete search history.

(56) References Cited

U.S. PATENT DOCUMENTS

| | | | |
|---|---|---|---|
| 4,583,796 A * | 4/1986 | Nakajima et al. ........... | 312/405 |
| 6,340,199 B1 | 1/2002 | Fukumoto et al. | |
| 6,641,205 B1 | 11/2003 | Russell et al. | |
| 2007/0125003 A1 | 6/2007 | Wartzack et al. | |

FOREIGN PATENT DOCUMENTS

| | | |
|---|---|---|
| DE | 4314115 A1 | 11/1994 |
| DE | 9321411 | 11/1997 |
| DE | 10334143 A1 | 2/2004 |
| EP | 1057673 A1 | 12/2000 |
| EP | 1275539 A1 | 1/2003 |
| EP | 1057673 B1 | 1/2005 |
| EP | 1275539 B1 | 10/2007 |
| FR | 2892345 | 4/2007 |
| JP | 59034924 A | 2/1984 |
| WO | 2004/110799 | 12/2004 |

OTHER PUBLICATIONS

German Search Report for 10 2006 055 817.0-24 dated Jul. 30, 2009.

* cited by examiner

*Primary Examiner*—Lori L Lyjak
(74) *Attorney, Agent, or Firm*—Gregory Brown; Brooks Kushman P.C.

(57) ABSTRACT

The invention relates to a vehicle door for closing a door opening provided in a vehicle frame, and to a vehicle door system with the vehicle door according to the invention. The vehicle door has body panels, an inner panel which, in the fitted position, faces the vehicle interior, and an outer panel which, in the fitted position, faces away from the vehicle interior, said panels being connected fixedly to each other and delimiting a cavity.

With the proviso of providing a vehicle door of the type mentioned at the beginning, which can be produced in a less complicated manner, it is proposed that an end panel for delimiting the cavity is provided as a further body panel at least on one narrow side of the vehicle door, and that the end panel is connected fixedly laterally to the outer panel and the inner panel.

7 Claims, 2 Drawing Sheets

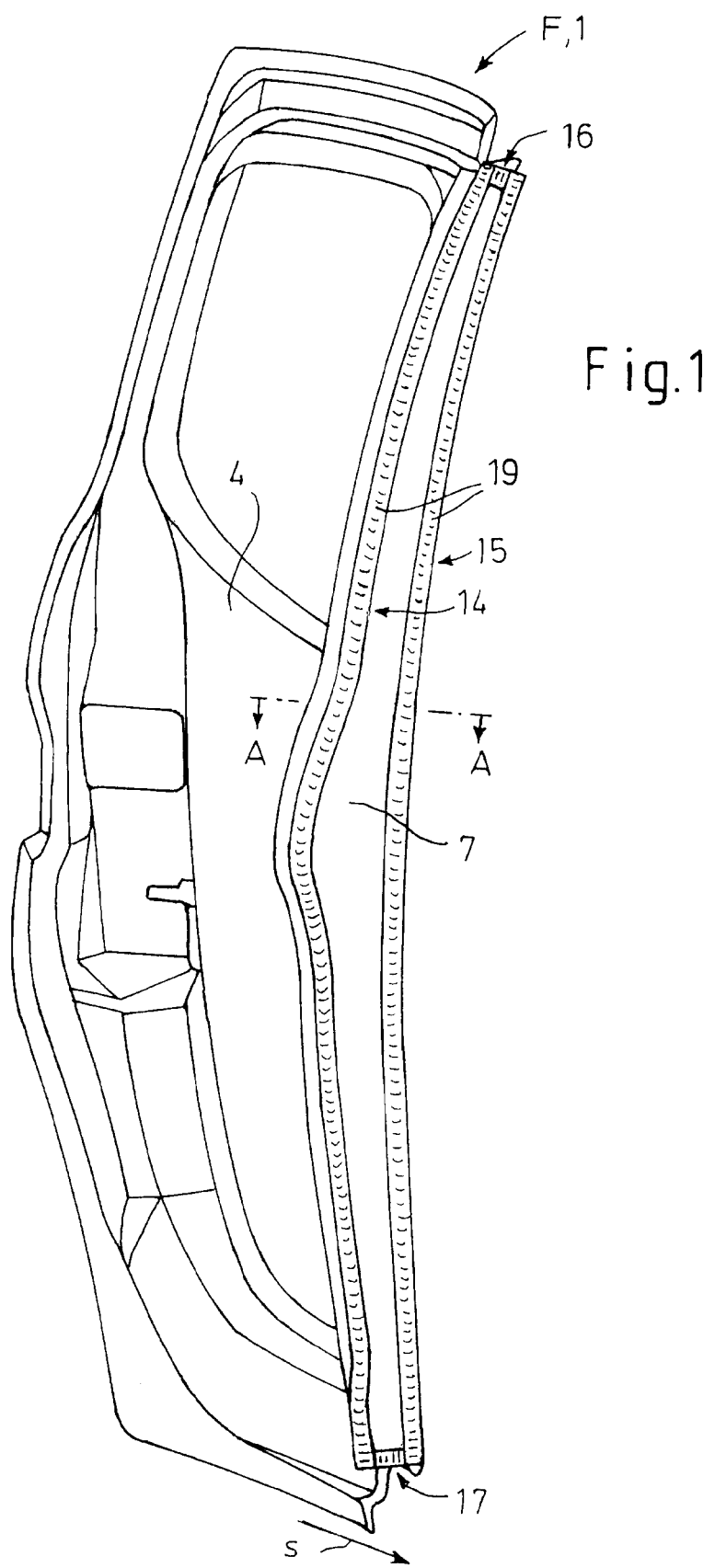

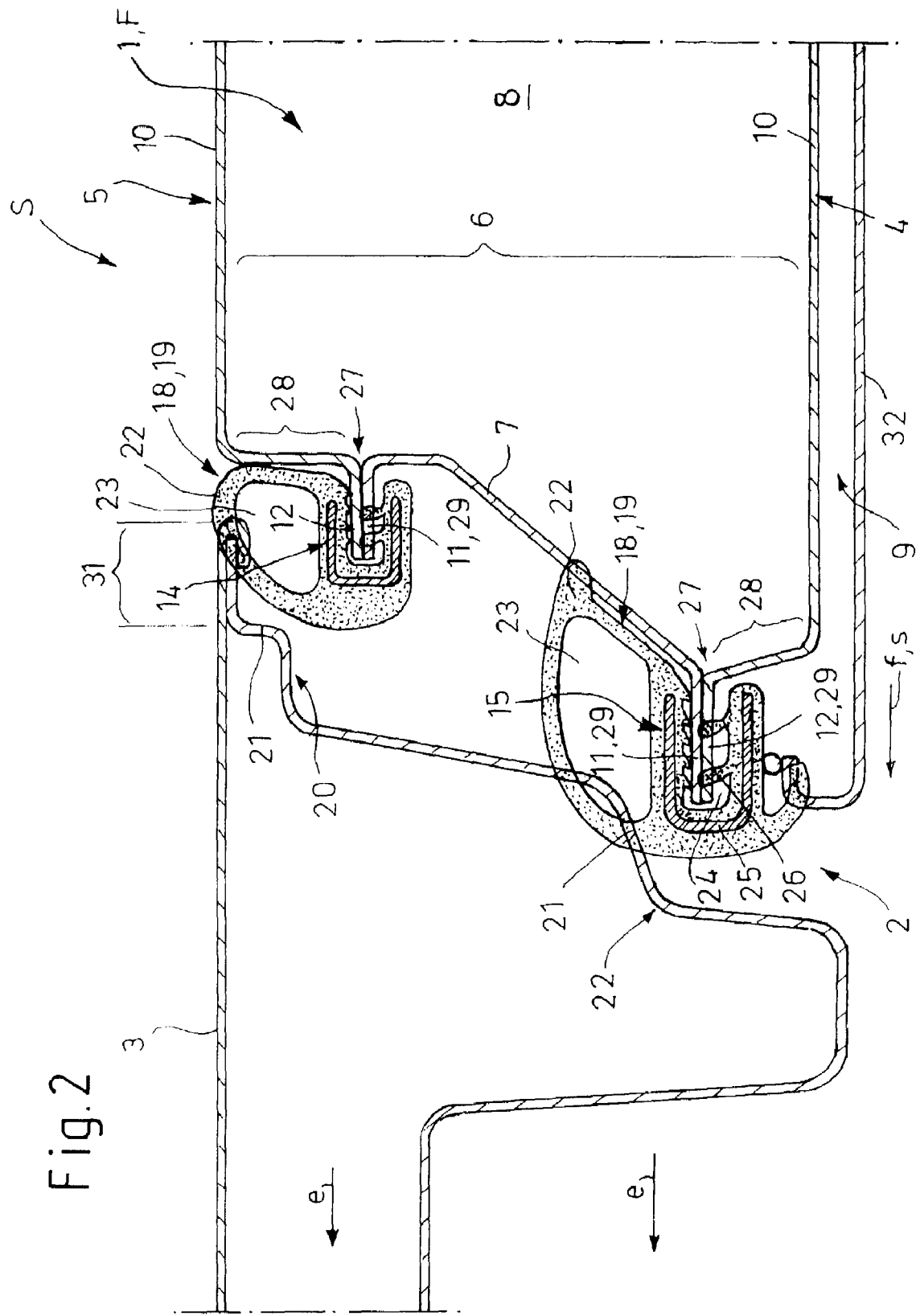

SEALING SYSTEM OF B-PILLARLESS REAR SLIDING DOOR

FIELD OF INVENTION

This invention relates to a vehicle door and sealing system for closing a door opening provided in a vehicle frame.

SUMMARY OF THE INVENTION

The body panels of a vehicle door may be deep-drawn and, when deep-drawn, have an outwardly open interior. To assemble the vehicle door, the body panels are arranged, in order to form the cavity, with their interiors facing each other and are connected to each other. This is apparent, for example, from EP 1 057 673 B1 or EP 1 275 539 A1. In order, during the deep-drawing, to avoid undercuts which are complicated in terms of deep-drawing and to ensure easier removability from the mold, the body panel to be deformed in each case is generally designed in such a manner that the interior and the side walls laterally delimiting the interior widen conically outward, as a result of which the body panel obtains a trough-like basic shape. A deformation operation to be carried out in this case depends essentially on the degree of deformation, in particular on the depth of the interiors to be provided. The removability from the mold is also made more difficult as the interior depth increases.

The invention is therefore based on the object of providing a vehicle door of the type mentioned at the beginning, which can be produced with little outlay.

The object set is achieved according to the invention in that an end panel for delimiting the cavity is provided as a further body panel at least on one narrow side of the vehicle door, and that the end panel is connected fixedly laterally to the outer panel and the inner panel.

Bent-over partial regions of outer panel and/or inner panel, which partial regions laterally delimit the cavity and form narrow sides and, in the case of a conventional vehicle door, are subjected, during the deep-drawing process, to a heavy deformation which is therefore complicated in terms of the method and complex in terms of the material can therefore be at least partially replaced by the end panel. The deformation-intensive partial regions may be reduced by the extension of the end panel perpendicularly to the larger side surfaces of inner panel or outer panel, or may even be completely omitted. Furthermore, the additional end panel enables the cavity of the vehicle door to be designed in such a manner that undercuts are possible perpendicular to the larger side surface of the outer panel or of the inner panel, with respect to a direction of removal from the mold, without the undercut at least making the deformation of the individual body panels more difficult by the undercuts being inserted as shaped regions perpendicular to the larger side surface of the end panel. In order to delimit the cavity in the fitted position and in order to be easily removable from the mold during the deep-drawing operation, a customary outer panel and inner panel have a cross-sectional shape which, in principle, is U-shaped with short limbs as bent-over partial regions, with the limbs being designed such that they peter out in a slightly conical manner in the direction toward their free ends. The construction according to the invention of the vehicle door provides a relatively large freedom of design, thus enabling, for example, a cross-sectional shape of the vehicle door that increases the rigidity of the vehicle door to be designed.

The end panel is preferably connected laterally over the full circumferential extent to the inner panel and the outer panel such that the cavity is completely separated, at least toward the end panel, from a surrounding space. This simplifies the construction of the end panel.

It can expediently be provided that the end panel comprises connecting regions on the edge sides for its connection to the inner panel and the outer panel, and outer panel and inner panel comprise connecting sections on the edge sides, and that connecting regions and connecting sections overlap in a connecting position and/or bear at least partially in a sheetlike manner against each other. In this case, the connecting sections and connecting regions may be, for example, adhesively bonded, soldered or welded to each other.

In the connecting position, connecting regions and connecting sections preferably extend away from the cavity at their free ends at least with one path component, the connecting regions and/or the connecting sections assigned in each case to them being bent over and, in the connecting position, forming a common connecting flange. Since the end panel can be connected over the full circumferential extent to the inner panel and to the outer panel, the connecting flange can completely surround the end panel on the edge side and annularly. Owing to their direction of extent away from the cavity, the connecting flanges are easily accessible from the outside, for example in order to produce their connection of connecting region and connecting section.

For this purpose, the two connecting regions can be bent over to a lateral extent in order to bear against the connecting section of the respectively assigned panel. The direction of the longitudinal extent of the connecting regions can therefore be the same as that of the connecting sections. The bending over of the connecting regions and/or of the connecting sections can expediently take place with the deep-drawing of the end panel or of the outer panel and/or of the inner panel.

In one embodiment, the connecting flange is arranged on the narrow side of the vehicle door. The connecting flange preferably extends in a direction of extent essentially perpendicular to the end panel. The connecting flange can have an outer connecting flange and an inner connecting flange in the fitted position. In the fitted position, inner and outer connecting flanges can run essentially vertically in this case. Furthermore, in the fitted position, the two connecting flanges can be connected on their end sides with respect to their longitudinal extent by an upper connecting flange and a lower connecting flange to form a preferably closed flange ring. In its profile, the flange ring preferably follows the profile of the end panel and preferably remains approximately the same in its flange height, i.e. in its extent away from the end panel. In the fitted position of the vehicle door as a side door, the connecting flange can extend approximately in or counter to the direction of travel or with a larger path component in or parallel to a larger side surface of the vehicle door. The connecting flange is therefore arranged without interference in terms of design and can be provided, as explained further below, for further functions. The end panel preferably extends completely or virtually completely in a plane between the connecting flanges, which simplifies the construction of the car door. In a design variant, the end panel can be connected to the body panels which are adjacent to it, with the outer connecting flange and the inner connecting flange being formed.

In a development of the vehicle door, the same has a sealing device for its sealing in the door opening. Furthermore, the connecting flange can be designed for receiving sealing elements of the sealing device, and/or the sealing elements can be adapted to the connecting flange.

The sealing elements preferably have a sealing material, such as rubber or plastic, to form a longitudinal body with longitudinal air chambers for elastic and sealing bearing against a sealing surface provided on a vehicle frame part or on an adjacent vehicle door, and are preferably extruded with a receiving longitudinal groove for the associated connecting flange. The sealing elements can furthermore preferably be plugged or pushed onto the connecting flange by means of the receiving longitudinal groove in a plug-in position. The sealing elements can thus be fitted on the connecting flange in such a manner that they virtually completely or completely overlap the latter in its longitudinal extent preferably parallel to the end panel and/or in a direction preferably perpendicular to the end panel.

A preferably U-shaped spring element which is known per se and is intended for receiving the respective connecting flange is preferably integrated in the receiving longitudinal groove and is preferably open outward by means of the receiving longitudinal groove. The spring element can be arranged in such a manner that it runs with its limbs parallel to the inner side walls of the receiving longitudinal groove and is open toward the groove opening. The spring element can form the side walls of the receiving longitudinal groove. The spring element can be co-extruded with the sealing element, or the sealing material can be extruded via the spring element, with the spring element preferably being embedded after this in the sealing material. The extruded sealing material can also be placed over the spring element and connected thereto. To improve the support of the sealing element on the connecting flange, flexible retaining projections may be provided on a groove side surface of the receiving longitudinal groove, which retaining projections project through the receiving groove and, in the plug-in position, bear laterally under stress against the connecting flange. The retaining projections protrude through the receiving groove, preferably with a path portion away from the interior. The longitudinal air chambers, in particular of the vertical sealing elements, can preferably serve to conduct away water. This permits the integration of the water guidance system on the end side of the sliding door into the sealing system.

The sealing elements can form a preferably closed sealing ring. For this purpose, a sealing strand which is extruded as an initial product can be cut to a matching size and adhesively bonded on the end sides to form the sealing ring. Sealing ring sections which are assigned to the respective connecting flanges are preferably cut individually to size from the sealing strand and adhesively bonded or vulcanized on the end sides to form the common sealing ring. The sealing ring is expediently matched in its profile to the flange ring. The sealing ring can therefore be brought as a whole over the flange ring or pulled onto the latter. In a modification in which the end panel is merely connected to the body panels adjacent to it, with the outer connecting flange and the inner connecting flange being formed, connecting pieces which connect the adjacent ends of the two connecting flanges to each other can be provided for forming the annular flange. Said connecting pieces can be adhesively bonded or vulcanized to the ends. The connecting pieces may be fitted, pushed or plugged onto a support and/or into a receptacle in the vehicle door.

In an embodiment, the outer connecting flange is arranged by an amount in front of the inner connecting flange in the direction of extent. The amount may be identical to, approximately identical to or somewhat larger than the extent of the inner connecting flange in the direction of extent. Since, as a result, the two connecting flanges overlap or adjoin each other in the direction perpendicular to a larger side surface of the vehicle door, a sealing, which is stepped toward the passenger compartment, of the vehicle door to the vehicle frame or to an adjacent door can take place. The outer and the inner connecting flanges or mutually opposite connecting flanges are preferably arranged at an inclination with respect to each other with a small path portion perpendicular to the direction of extent. This can make it easier to position the end panel before it is connected to the body panels. Furthermore, it can thereby be possible for the connecting flanges not to extend perpendicularly to the sealing surface assigned to them but rather at a preferred small inclination with respect thereto.

The connecting flange can be welded, preferably spot-welded.

In a development of the vehicle door, the inner panel and/or the outer panel can each be bent over in an edge-side end section toward the narrow side. Furthermore, the end section of the inner panel and/or of the outer panel, in a first region, can form a region of the narrow side of the vehicle door and, in a second section, can be connected to the end panel, with at least a partial section of the connecting flange being formed. The second region can therefore form the connecting section which, as described above, can be bent over at least with one path component pointing away from the cavity in order to form a common connecting flange with the connecting region of the end panel. As a result, the relevant sections of the connecting flange can be offset from the outside or inside of the car door into the narrow side in such a manner that the sealing elements which are placed on do not protrude over the larger side surface of the inner panel and/or of the outer panel even in a sealing position, and can therefore be brought better to seal against a sealing surface provided on a vehicle frame part or on an adjacent vehicle door. The respective end section can enclose an angle of 60° to 120°, preferably of 75° to 105° or more preferably of 85° to 95° with the larger side surface connected to it. This makes it possible, inter alia, to determine the amount by which the outer connecting flange is arranged in front of the inner connecting flange in the direction of extent.

The invention furthermore comprises a vehicle door system which has a vehicle frame with a door opening and a vehicle door according to one of the previously described embodiments and variations, the vehicle door being movable in a closing direction from an open position into the door opening into a closed position.

The door opening can be delimited statically with respect to the vehicle body by means of vehicle frame parts or dynamically partially with respect to the vehicle body by an adjacent second vehicle door. The latter case is provided in a known manner, for example if a central pillar or B pillar is absent, as a result of which an individual door opening which is at the rear in the direction of travel or X direction of the vehicle and a door opening which is at the front in the direction of travel are combined to form an overall door opening which is expanded in relation to the individual door openings. As customary in general, the vehicle door can be fixable in the closed position by means of a locking device.

In general, the vehicle door can be pivotable and/or displaceable in the closing direction into the door opening. The end panel which is arranged on one narrow side can preferably be positioned in such a manner that it points in the closing direction with at least one path portion and/or over one region.

The vehicle door is preferably designed as a sliding door which can be displaced in a closing direction from the open position into the closed position along a sliding path which is nonlinear relative to the vehicle frame. In this case, the end panel can be arranged on that narrow side of the vehicle door which is at the rear in the closing direction. In vehicle manufacturing, in particular in passenger motor vehicle manufacturing, sliding doors are generally arranged on sides of the vehicle parallel to the direction of travel or displaceably in the x direction of the vehicle and are closed in the direction of travel in the case of sliding doors arranged at the rear in the direction of travel and are closed counter to the direction of travel in the case of sliding doors arranged at the front in the direction of travel, and therefore the larger side surfaces or those of the sliding door run parallel to the side surface of the vehicle body and the sliding door is integrated in the vehicle body in the closed position. In this case, as also claimed here, sealing elements which can have the design as described further above are customarily provided on the rear narrow side.

The vehicle door which is designed as a sliding door can be displaceable via a guide device with guide rails. In this case, a guide rail which is at the rear in the closing direction and in which the sliding door is mounted displaceably by means of an end region which is at the rear in the closing direction can have an S-shaped profile with an end section which is at the rear in the closing direction and, in the closed position, is arranged approximately parallel to the larger side surface of the sliding door. In this case, "approximately parallel" is understood as meaning a positive or negative deviation of a few degrees such that the rear end section can be guided with a small path portion toward the vehicle interior or with a small path portion to the outside. An orientation of the rear end section parallel to the larger side surface of the sliding door in the closed position is preferred.

In this connection, in the closed position, the end panel can bear in a sealing manner against a pillar, preferably against a B pillar, of the vehicle frame or against a side surface of an adjacent second vehicle door. The end panel is therefore displaced in the closing direction against an end surface of a corresponding vehicle frame part, such as the B pillar, or, for example in the case of a vehicle frame without a B pillar, against an adjacent end surface of a neighboring door and, by means of the sealing device, bears in a sealing manner against the respective end surface. A sealing profile with at least one sealing surface for bearing in a sealing manner against the sealing elements of the vehicle door in its closed position can therefore be provided, the sealing surface being provided on a vehicle frame part or on a narrow side of an adjacent door, which frame part or narrow side lies opposite the sealing flange, which is assigned to it, of the vehicle door which is to be sealed and has the sealing element, in the closed position.

BRIEF DESCRIPTION OF THE DRAWINGS

The present invention is explained in more detail below with reference to an exemplary embodiment which is illustrated in a drawing. In the drawing:

FIG. 1 shows a perspective side view of a sliding door without an outer panel; and FIG. 2 shows a horizontal sectional view through part of a vehicle door system with the sliding door in a sectional profile A-A according to FIG. 1.

DETAILED DESCRIPTION OF THE INVENTION

FIG. 1 shows a perspective side view of a vehicle door F, which is designed as a sliding door 1, for closing a door opening 2 provided in a vehicle frame (not illustrated specifically). FIGS. 2 and 3 illustrate, in a simplified and schematized form, a horizontal and vertical sectional view through part of a vehicle door system S with the sliding door 1 in a sectional profile A-A and B-B according to FIG. 1. FIG. 2a shows an enlargement of a detail IIa according to FIG. 2. In FIGS. 2 and 3, the sliding door 1 closes the door opening 2 in a closed position shown here and adjoins an adjacent side door 3. A vehicle frame is therefore provided without a "B pillar", and therefore the door opening can be closed jointly by the sliding door 1 and the pivoting door 3. The side door 3 is designed here as a pivoting door which is shown in a closed position in FIG. 2, with its pivot axis being arranged outside the partial view, shown in FIG. 2, of the vehicle door system S and that section of the side door 3 which is shown in FIG. 2 being pivoted into the door opening 2.

The sliding door 1 has an inner panel 4 which, in the fitted position, faces the vehicle interior, and an outer panel 5 which, in the fitted position, faces away from the vehicle interior, and also, according to the invention, an end panel 7 for delimiting a cavity 8 as a further body panel on one narrow side 6 of the sliding door 1. The end panel 7 is connected fixedly laterally and over the full circumference to the inner panel 4 and the outer panel 5. For the sake of clearer illustration of the invention, the sliding door 1 is shown in FIG. 1 without the outer panel.

The sliding door 1 can be displaced via a guide device (not illustrated) with guide rails in a closing direction s from an open position (not shown here) into a closed position which is reproduced in FIG. 1. A guide rail (likewise not illustrated here) which is at the rear in the closing direction s and in which the sliding door 1 is mounted displaceably with an end region 9 which is at the rear in the closing direction s has an S-shaped profile with an end section which is at the rear in the closing direction s and, in the closed position, is arranged approximately parallel to a larger side surface 10 of the sliding door 1. As a result, the sliding door 1 is guided with its end region 9 on the rear end section approximately parallel to the larger side surface 10 and therefore, when the sliding door 1 is fitted as a side door at the rear in the direction of travel f, in the direction of travel f, with said direction of travel then being approximately identical to the closing direction s. This has the result that, when the closed position is reached, the narrow side 6 with the end panel 7 is guided perpendicularly or virtually perpendicularly toward the side door 3 and has been in FIG. 2.

As can be gathered in particular from FIG. 2, the end panel 7 is bent over on the edge side to form connecting regions 11. Inner panel 4 and outer panel 5 are each bent over in the same manner to form connecting sections 12 which extend here away from the cavity 8 in the direction of extent e and, in the connecting position shown here, bear in a sheetlike manner against each other. The direction of extent e corresponds here approximately to the direction of travel f and the closing direction s. The connecting regions 11 and connecting sections 12 are spot-welded to each other to form a common connecting flange 14, 15. The spot-welding itself is not reproduced separately in the section, which is designed as a schematic diagram, in FIG. 2, so as to be able to more clearly show the relative position of connecting regions 11 and connecting sections 12.

As can be gathered from FIG. 1, the connecting flange has an outer connecting flange 14 which, in the fitted position, faces away from the passenger compartment, and an inner connecting flange 15 which, in the fitted position, faces the passenger compartment, said connecting flanges 14, 15 being sectioned in FIG. 2. Furthermore, in the fitted position, the inner connecting flange 15 and the outer connecting flange 14 are connected on the end sides with respect to their longitudinal extents by an upper connecting flange 16 and a lower connecting flange 17 such that the interconnected connecting flanges 14-17 have a closed flange ring form.

A sealing ring 19 which is matched to the connecting flange 14, 15, 16, 17 and is closed annularly, as part of a sealing device of the sliding door 1 in the door opening 3, is placed onto the connecting flange 14, 15. In order to seal the sliding door 1, the sealing element 18 is guided laterally on the front side door 3 against a sealing profile 20 with sealing surfaces 21 and would have to be illustrated in an appropriately deformed manner in an illustration, which is true to reality, of the closed position of the sliding door 1. In order, however, to reproduce the function and a deformable volume of the sealing element 18 at the same time here, the sealing element 18 is illustrated undeformed in the schematic diagrams in FIGS. 2 and 3, with the deformable volume of the sealing element 18 being that region of the sealing element 18 which projects into the sealing profile 20.

The sealing elements 18 are extruded from a sealing material, such as rubber or plastic, to form a longitudinal body 22 with longitudinal air chambers 23 for the elastic and sealing bearing against the respectively provided sealing surface 21. The sealing elements 18 are manufactured with a receiving longitudinal groove 24 for plugging the sealing elements 18 onto the associated connecting flange 14, 15, with the sealing elements 18 being reproduced in a plug-in position in which they are positioned on the connecting flange 15 by means of the receiving longitudinal groove 24. For reinforcement and clamping on the receiving longitudinal groove 24, a U-shaped spring element 25 is provided which is embedded in the sealing material of the sealing element 18 and which reinforces a secure support of the sealing element 18 on the connecting flange 14, 15. In addition, in order to improve the support of the sealing elements 18 on the connecting flange 14, 15, flexible retaining projections 26 are arranged on the inside of the receiving longitudinal groove 24, which retaining projections protrude through the receiving longitudinal groove 24 and, in the plug-in position, bear laterally under stress against the connecting flange 15. The retaining projections 26 protrude through the receiving longitudinal groove 24 with a path portion away from the cavity 8, i.e. here in the direction of travel f. Its deformation in the plug-in position, like that of the sealing elements 18 in the closed position, is not shown.

In order to improve the sealing of the narrow side 6 of the sliding door 1 against the side door 3, inner panel 4 and outer panel 5 are each bent over toward the narrow side 6 in an edge-side end section 27, the end sections 27 each, in a first region 28, forming a section of the narrow side 6 of the sliding door 1 and, in a second region 29, forming the connecting section 12 which, welded together with the connecting region 11 of the end panel 7, forms the inner connecting flange 15 and the outer connecting flange 14. As a result, the connecting flanges 14, 15 are each offset from the inside or the outside toward the center of the narrow side 6. The front side door 3 furthermore has, on its outer side 30, an overlapping region 31 which extends counter to the direction of travel f and, in a closed position of the side door 3 and the sliding door 1, covers and protects the outer connecting flange 14 with the sealing element 18 plugged thereon, in particular in the section in which the sealing element 18 acts on the sealing surface 21 assigned to it and therefore the actual sealing operation takes place.

In addition, the outer connecting flange 14 is arranged in front of the inner connecting flange 15 in the closing direction s or in the direction of extent e, with the sealing profile 20 on the side door 3 being designed such that it matches it in a correspondingly stepped manner. By this means, the sealing of the sliding door 1 on its narrow side 6 takes place in a sealing direction d from the outer panel 5 to the inner panel 4, with the outer connecting flange 14, with its sealing element 18 in the closing direction s in front of the inner connecting flange 15 with its sealing element 19, acting in a sealing manner on the sealing surface 21 assigned in each case to them and therefore covering and protecting the section in which the sealing element 19 of the inner connecting flange 15 acts on the sealing surface 21 assigned to it, and therefore the actual sealing operation takes place. The sealing of the sliding door 1 on its narrow side 6 therefore takes place from the outside to the inside in steps which are offset with respect to one another in the direction of travel f.

As can furthermore be gathered from the sectional view in FIG. 2, opposite connecting flanges 14, 15 are arranged at an inclination by a small angular amount with respect to each other.

Fitting of the end panel 7 into the narrow side 6 therefore makes the deep-drawing of the inner panel 4 and outer panel 5 easier and simpler. The end panel 7 is connected to the inner panel 4 and the outer panel 5, which is easily accessible from the outside, with the connecting flanges 14, 15 which extend away from the cavity 8 and approximately in the closing direction s being formed. The connecting flanges 14, 15 serve at the same time as simple supports of the sealing elements 18 which can be plugged in and which annularly surround the end panel 7. This provides a double sealing of the sliding door 1 in the region of the end panel. As a result of the profile, which is approximately parallel to the larger side surface 10 of the sliding door 1, of the rear end section (not shown here) of the guide device (not illustrated), the sliding door is guided with its narrow side 6 perpendicular or approximately perpendicular with respect to the sealing profile 20. As a result of this, it does not matter whether the sealing profile is arranged on a vehicle frame part or on the adjacent side door 3 shown here.

A sealing action by means of the sealing elements 19 bearing against the sealing surfaces 21 is improved structurally by means of further measures by the outer connecting flange 14 being arranged in front of the inner connecting flange 15 in the closing direction and therefore a stepped sealing taking place in the direction from the outer panel 5 to the inner panel 4. Furthermore, the two connecting flanges 14, 15 are not arranged at the edge of the narrow side 6 but rather toward its center. Furthermore, the overlapping region 31 of the side door 3, on which the sealing element 19 of the outer connecting flange 14 bears in a sealing manner on the inside in the closed position, covers said sealing element in a protective manner.

An interior covering 32 is provided mounted in front of the inner panel 4 on the inside, said interior covering being sealed off at the same time toward the side door 3 in the direction of travel f by the sealing element 19 which is plugged onto the inner connecting flange 15.

What is claimed is:

1. A vehicle door for closing a door opening provided in a vehicle frame, the vehicle door comprising:
    an inner panel that faces the vehicle interior when the door closes the door opening;
    an outer panel faces away from the vehicle interior when the door closes the door opening, the inner and outer panels are fixedly connected to each other to define a cavity; and
    an end panel further defines the cavity on one narrow side of the vehicle door, wherein the end panel has a first lateral edge side that is fixedly connected to an inner connecting section on the inner panel and a second lateral edge side that is fixedly connected to an outer connecting section on the outer panel, wherein the lateral edge sides and the connecting sections bear against each other in a face-to-face orientation and extend away from the cavity to form an inner connecting flange and an outer connecting flange.

2. The vehicle door as claimed in claim 1, wherein the connecting flange is arranged on the narrow side of the vehicle door to extend essentially perpendicular to the end panel.

3. The vehicle door as claimed in claim 2, wherein the inner connecting flange and the outer connecting flange are connected on their upper and lower end sides by an upper connecting flange and a lower connecting flange to form a flange ring.

4. The vehicle door as claimed in claim 1, wherein a seal is provided for sealing the vehicle door in the door opening, and wherein the connecting flanges receive the seal.

5. The vehicle door as claimed in claim 4, wherein the seal is a longitudinal body that bears against a sealing surface provided on a vehicle frame part or on an adjacent vehicle door to form a longitudinal air chamber, and wherein the seal is extruded with a longitudinal groove that receives the associated connecting flange.

6. The vehicle door as claimed in claim 4, wherein the seal forms a sealing ring.

7. The vehicle door as claimed in claim 2, wherein the outer connecting flange is arranged in front of the inner connecting flange in the direction that the flanges extend.

* * * * *